United States Patent [19]

Sugino et al.

[11] Patent Number: 5,202,996
[45] Date of Patent: Apr. 13, 1993

[54] SOFTWARE STRUCTURING SYSTEM AND METHOD BY DATA TABLE TRANSLATION

[75] Inventors: Kazuhiro Sugino; Noboru Tsuchiya; Tadamasa Kamikubo; Hisashi Onari, all of Yokohama, Japan

[73] Assignee: Hitachi, Ltd., Tokyo, Japan

[21] Appl. No.: 527,715

[22] Filed: May 23, 1990

Related U.S. Application Data

[63] Continuation of Ser. No. 918,002, Oct. 14, 1986, abandoned.

[30] Foreign Application Priority Data

Oct. 11, 1985 [JP] Japan .................. 60-224705

[51] Int. Cl.$^5$ .............................. G06F 15/60
[52] U.S. Cl. .................. 395/700; 395/600; 364/274; 364/274.1; 364/275.1; 364/275.6; 364/282.1; 364/283.1; 364/DIG. 1
[58] Field of Search .............. 364/200 MS, 900 MS; 395/600, 700, 922

[56] References Cited

U.S. PATENT DOCUMENTS

| | | | |
|---|---|---|---|
| 4,506,326 | 3/1985 | Shaw et al. | 364/300 |
| 4,661,904 | 4/1987 | Kurakake et al. | 364/200 |
| 4,677,585 | 6/1987 | Ikegami et al. | 364/900 |
| 4,680,728 | 7/1987 | Davis, II et al. | 364/900 |
| 4,688,167 | 8/1987 | Agarwal | 364/200 |
| 4,734,854 | 3/1988 | Afshar | 364/200 |
| 4,866,634 | 9/1989 | Rebon et al. | 364/513 |

OTHER PUBLICATIONS

Zloof, M. M. "Query-by-Example: The Invocation and Definition of Tables and Forms" in: *1st International Conference on Very Large Databases,* 1975.

Adiba, M. "Derived Relations: A Unified Mechanism for Views, Snapshots and Distributed Data" in: *Proceedings of the 7th Internat'l Conference on Very Large Databases,* 1981.

Yao, S. B. et al. "Structured Application Generation Using XDB" in: AFIPS Conference Proceedings, 1985 *Nat'l Computer Conference,* 1985, pp. 481–491.

Horowitz, E et al. "A Survey of Application Generators". IEEE Software, vol. 2, No. 1 (Jan., 1985), pp. 40–54.

"Structure Analysis and System Specification" by Tom DeMarco, *Yourdon Inc.* (1987) pp. 227–279.

Primary Examiner—David L. Clark
Assistant Examiner—Maria N. Von Buhr
Attorney, Agent, or Firm—Antonelli, Terry, Stout & Kraus

[57] ABSTRACT

System and method of designing and developing table translation software in which an operation is performed on input data provided in the form of tables, and data resulting from the operation is also provided in the form of tables. The system includes an item input section for inputting items representative of attributes of data, a relation input section for inputting inter-item relations for the inputted items, an item and relation managing section for holding and supplying the inputted items and inter-item relations thereof, and a relation indicating section for indicating the items and the inter-item relations thereof held by the item and relation managing section. Software is designed and developed with the functions of the software being handled as translation processes of the tables.

4 Claims, 16 Drawing Sheets

| PRODUCTION PLAN (TABLE) ||||
|---|---|---|---|
| PRODUCT | QUANTITY | DELIVERY DATE | STARTING DATA |
|  |  |  |  |
|  |  |  |  |
|  |  |  |  |
|  |  |  |  |
|  |  |  |  |

} RECORDS

INTRA-TABLE CALCULATION

TABLE COMBINATION

: TABLE

FIG. 9

| | | |
|---|---|---|
| DEFINITION OF DATA | ACQUIRE | ACQUIRING OF DATA BASE AREA |
| | CREATE | PREPARATION OF TABLE, INDEX, etc. |
| | DROP | DELETION OF TABLE, INDEX, etc. |
| | ALTER | ADDITION OF COLUMN TO TABL |
| | COMMENT | SUPPLEMENT OF COMMENT |
| HANDLING OF DATA | SELECT | RETRIEVE OF DATA (TABLE TRANSLATION) |
| | INSERT | PREPARATION OF DATA (TABLE TRANSLATION) |
| | UPDATE | UPDATING OF DATA (TABLE TRANSLATION) |
| | DELETE | DELETION OF DATA |
| CONTROL | CONNECT | START OF EXECUTION |
| | EXIT | END OF EXECUTION |
| INPUT/ OUTPUT OF DATA | INPUT | INPUT OF DATA |
| | DATALOAD | INPUT OF DATA FROM EXTERNAL FILE |
| | DATAOUT | OUTPUT OF DATA TO EXTERNAL FILE |
| DISPLAY | DISPLAY | DISPLAY OF TABLE, INTERNAL VARIABLES, etc. |
| | CHART | DISPLAY OF BAR GRAPH |
| CURSOR | DECLARE | DECLARATION OF CURSOR |
| | OPEN | OPENING OF CURSOR |
| | FETCH | FETCHING OF ONE SET OF DATA |
| | REPLACE | UPDATING OF DATA |
| | CLOSE | CLOSING OF CURSOR |
| INTERNAL VARIABLES | CREATE | DECLARATION AND INITIALIZATION OF INTERNAL VARIABLES |
| | SET | ALTERATION OF VALUES OF INTERNAL VARIABLES AND COLUMNS (SUBSTITUTION) |

| | | |
|---|---|---|
| CONTROL OF SEQUENCE OF EXECUTION | DO | CALL OF MACRO-COMMAND |
| | IF | EXECUTION OF COMMAND THROUGH CONDITIONAL BRANCHING |
| | WHILE | "WHILE" LOOP |
| | REPEAT | "REPEAT" LOOP |
| | BREAK | END OF LOOP |
| | LOOP | PROCEEDS TO NEXT LOOP |
| | RETURN | END OF EXECUTION OF MACRO-COMMAND |
| | PROC | DEFINITION OF MACRO-COMMAND |
| IMAGE CONTROL | ERASE | ERASURE OF IMAGE |
| | READ | DATA INPUT FROM IMAGE |
| | WRITE, ? | DATA DISPLAY ON IMAGE |
| AUXILIARY | HELP | ELUCIDATION OF COMMAND |
| EXECUTION OF COMMAND CORRECTION | L | DISPLAY OF COMMAND |
| | F | SEARCH OF CHARACTER STRING |
| | C | REPLACEMENT OF CHARACTER STRING |
| | M | MOVEMENT OF POINTER |
| | G | EXECUTION |
| | S | SKIP |
| | A | STOP |
| | N | INTERRUPT EXECUTION OF NEW COMMAND |
| FUNCTION | FORM TRANSFORMATION PROCESSING OF CHARACTER STRING EOF CHECK OF CONDITIONS MAXIMUM, MINIMUM | |
| | OTHERS | |

FIG. 10

| NO | NAME OF FUNCTION | NAME OF COMMAND | CONTENTS OF FUNCTIONS |
|---|---|---|---|
| 1 | PART EXPLOSION | EXPLODE 2 TYPES | CALCULATION OF THE NUMBER OF COMPONENT PARTS AND TIME REQUIRED FOR EACH INPUT LOT (PRODUCT, QUANTITY, TIME LIMIT) IN A PRODUCTION PLAN |
| 2 | SETTING OF LOT | LOTSIZE 4 TYPES | GROUPING OF LOTS FOR SAME ORDERED PRODUCT OR DIVISION OF LOTS FOR PREPARATION OF JOB ORDERS |
| 3 | DEVELOPMENT OF PROCESS STEP | ROUTE 1 TYPE | DETERMINATION OF SEQUENCE AND CONDITIONS REQUIRED FOR EXECUTION OF JOB ORDERS |
| 4 | INVENTORY CHECK | LOCATE 4 TYPES | COLLATION OF A QUANTITY OF ARTICLES (PARTS) REQUIRED FOR EXECUTING JOB ORDERS WITH THE TOTAL STOCK, CALCULATION OF NET QUANTITY AS REQUIRED OR DETERMINATION OF SUFFICIENT OR INSUFFICIENT STOCK |
| 5 | LOAD PROCESSING EN BLOC | LOAD 8 TYPES | LOAD PROCESSING EN BLOC FOR DETERMINATION OF THE NUMBER OF PROCESS STEPS FOR MAIN RESOURCE (EQUIPMENT, WORKERS) IN A TIME SPAN BETWEEN DELIVERY DATE AND STARTING DATE SET BY JOB ORDER |
| 6 | JOB SEQUENCE | SEQUENCE 4 TYPES | DETERMINATION OF PRIORITY OF JOB ORDERS IN ACCORDANCE WITH ESTABLISHED RULE |
| 7 | START SEQUENCE | SEQSET 1 TYPE | FOR JOB ORDERS EACH INVOLVING A SINGLE STEP, START SEQUENCE OF JOB ORDERS IS SO DETERMINED THAT THE TOTAL SUM OF PROGRAMMED VALUES THEREOF IS MINIMUM |
| 8 | LINE SEQUENCE | SEQLINE 1 TYPE | IN CASE OF LINE WORKS, SEQUENCE IN WHICH CERTAIN JOB ORDERS ARE EXECUTED IN LINE IS DETERMINED SO THAT THE MAXIMUM RATE OF OPERATION IS REALIZED |
| 9 | PREPARATION COMMAND | RELEASE 1 TYPE | FOR INPUT JOB ORDER, INSTRUCTION COMMANDING PREPARATION FOR STARTING JOB IS ISSUED |
| 10 | START COMMAND | DISPATCH 5 TYPES | JOBS HAVING PROCEEDED TO DESIGNATED STEPS ARE WEIGHTED IN ORDER IN ACCORDANCE WITH FIVE RULES TO ISSUE CORRESPONDING START COMMANDS |
| 11 | SIMULATION OF JOB | SIMULATE 1 TYPE | ACHIEVEMENT DATA INPUT FROM FLOPPY DISK OR KEYBOARD ARE STORED IN ACHIEVEMENT DATA TABLE |
| 12 | SIMULATION OF JOB | SIMULATE 1 TYPE | FOR ESTIMATING TIME TAKEN FOR EXECUTING EACH PROCESS STEP WITH ACCURACY, SIMULATION IS CONDUCTED ON THE ASSUMPTION THAT RESOURCE DESIGNATED BY JOB ORDER LIST IS OCCUPIED FOR A DESIGNATED TIME, TO DERIVE DATA OF ACHIEVEMENTS |
| 13 | UPDATING OF PROGRESS | PROGRESS 1 TYPE | ON THE BASIS OF ACHIEVEMENTS DATA, PROGRESS IN PRODUCTIONS FOR JOB ORDERS IS UPDATED BY RECORDING STEP STARTING AND END TIMES AS WELL AS PART ARRIVAL AND LEAVING TIMES |
| 14 | MONITORING OF PROGRESS | MONITOR 2 TYPE | BY PROCESSING ACHIEVEMENT DATA CONCERNING DESIGNATED ORDER CODE OR STEP CODE, PROGRESS OF ORDERED JOB OR ORDER BEING EXECUTED IS OUTPUTTED |
| 15 | COLLECTION OF ACHIEVEMENTS | MEASURE 4 TYPES | BY PROCESSING ACHIEVEMENTS DATA OVER A DESIGNATED PERIOD, DESIGNATED CONTENTS SUCH AS THE RATE OF OPERATION ARE SUMMED UP |
|  | IN TOTAL | 40 TYPES |  |

FIG. 13A
TABLE MANAGEMENT

| TABLE | INPUT/OUTPUT |
|---|---|
| PRODUCTION PLAN TABLE | INPUT/OUTPUT |
| STANDARD SCHEDULE TABLE | INPUT |
| PART ARRANGEMENT TABLE | INPUT |
| PART REQUEST TABLE | INPUT/OUTPUT |

FIG. 13B
ITEM MANAGEMENT

| ITEM | ATTRIBUTES | LENGTH |
|---|---|---|
| PRODUCT | CHARACTER STRING | 8 BYTES |
| QUANTITY | INTEGER | 4 |
| DATE OF DELIVERY | INTEGER | 4 |
| DATE OF START | INTEGER | 4 |
| NUMBER OF DAYS | INTEGER | 4 |
| PARTS | CHARACTER STRING | 8 |
| NUMBER OF PARTS | INTEGER | 4 |

FIG. 13C
INTRA-TABLE MANAGEMENT

| TABLE | ENTRY ITEMS |
|---|---|
| PRODUCTION PLAN TABLE | PRODUCT, QUANTITY, DELIVERY DATE, STARTING DATE |
| STANDARD SCHEDULE TABLE | PRODUCT, NUMBER OF DAYS |
| PART ARRANGEMENT TABLE | PRODUCT, PARTS, NUMBER OF PARTS |
| PART REQUEST TABLE | PART, QUANTITY, DELIVERY DATE |

FIG. 13D

INTER-TABLE RELATION MANAGEMENT

| DERIVED TABLE | INPUT TABLE | KEY ITEMS |
|---|---|---|
| PRODUCTION PLAN-TABLE | PRODUCTION PLAN TABLE / STANDARD SCHEDULE | PRODUCT, PRODUCT |
| PART REQUEST TABLE | PRODUCTION PLAN TABLE / PART ARRANGEMENT TABLE | PRODUCT, PRODUCT |

FIG. 13E

INTER-ITEM MANAGEMENT TABLE

| DERIVED ITEMS | INTER-ITEM MANAGEMENT TABLE |
|---|---|
| STARTING DATE | DELIVERY DATE−DAYS+1 |
| QUANTITY | QUANTITY × NUMBER OF PARTS |
| DELIVERY DATE | STARTING DATE −1 |

FIG. 13F

ITEM AREA MANAGEMENT

| ITEM |
|---|
| PRODUCT, QUANTITY, DELIVERY DATE, STARTING DATE, PARTS, NUMBER OF PARTS, DELIVERY DATE |

FIG. 13G

INTER-ITEM DEPENDENCE MANAGEMENT TABLE

| INTER-ITEM DEPENDENCE |
|---|
| PRODUCT → NUMBER OF DAYS FOR PRODUCTION THEREOF |
| PRODUCT → QUANTITY |
| PRODUCT → DELIVERY DATE |
| PRODUCT → STARTING DATE |
| PRODUCT • PARTS → NUMBER OF PARTS |

SOFTWARE STRUCTURING SYSTEM AND METHOD BY DATA TABLE TRANSLATION

This application is a continuation of application Ser. No. 918,002, filed on Oct. 14, 1986 now abandoned.

BACKGROUND OF THE INVENTION

The present invention generally relates to a software structuring system and method which can be used in a system for designing and developing softwares (programs). In particular, the invention is concerned with a table-translation type software structuring system and a method suited for designing and developing software which is functionally adapted to handle input/output data in the form of table formatted data.

Heretofore, design and development of software has been performed through the procedure mentioned below:

(1) In accordance with a requested software, output requirements are determined (i.e. determination is made as to what kinds of outputs are desired).

(2) Based on the output requirements thus determined, functions and data structure are determined.

(3) In accordance with the functions and the data structure, a framework of the whole software is designed, which is then followed by the analysis of software in terms of functional modules for designing details of the modules.

(4) On the basis of the designed modules, programming and debugging are conducted.

As will be appreciated from the above description, in the development of software, designing of data structure is conducted separately from the designing of the processing modules. This procedure does not coincide with the human's thinking process, imposing thus a great burden on the design engineer in proceeding with the designing. In the design of software, meanings and forms of data are taken into consideration for determining the processing procedure so that the desired data can be obtained ultimately. Consequently, alteration of functions conducted in the course of designing the software frequently requires alterations of the meanings and forms of data, which in turn exerts influence on the data structure. Alteration of the data structure involves alteration of the processing modules. Under the circumstances, with the hitherto known software designing technique, it is impossible to design the software so that the data structure can be handled integrally with the data processing. Second, intermediate results obtained in the course of designing can not be reused. Third, a human's trial-and-error procedure can not be admitted. For these reasons, a great difficulty is encountered in an attempt to enhance the productivity of software.

A system design procedure is disclosed in Tom DeMarco's "Structure Analysis and System Specification", YOURDON Inc. (1987) p.p. 227–279. In this literature, a process starting from the system design and leading to the development of software is discussed in connection with data structure and effective software design and development. However, the discussion does not go beyond the mere suggestion of approaches and discloses no practical designing systems which can run on a computer system. In other words, although the impossibility of integral handling of data structurization and data processing which provides a major obstacle in improving the productivity is described, no concrete proposal is made for solving this problem. Further, no suggestions are disclosed for dealing with the second and third problems mentioned above.

SUMMARY OF THE INVENTION

An object of the present invention is to overcome the problems of the prior art described above and provide a software structuring system and method of a table translation type which allows the data structure and the processing procedure to be integrally designed, while admitting the reuse of the intermediate results obtained in the course of design as well as the trial-and-error procedure.

Many of the production management softwares are so designed and developed that table-formatted data are inputted from a data file such as a disk, magnetic tape or the like, simple calculation is performed and the results thereof are outputted also as table-formatted data. Accordingly, if it is possible to utilize the data format (table) in the data processing itself, the intermediate results obtained only internally can then be imparted with meaning by making use of data concerning the table format. In the following description, the table-formatted data will be referred to simply as the table. With the term "table", it is thus intended to mean a collection of records of sets of attributes representing natures of individual data. Thus, a table can be expressed two-dimensionally with the fields containing the attributes and the records, as shown in FIG. 2 of the accompanying drawings.

The software structuring system of table translation type according to the present invention starts from the concepts mentioned below.

(1) Input/output data as well as the processing procedure intervening between the data input and the data output in executing software is regarded as a transition process of tables. This transition process is referred to as "table translation".

(2) Basic table translation includes an intra-table operation performed among fields within one and the same table (refer to FIG. 3A) and an inter-table operation performed among a plurality of tables (refer to FIG. 3B), wherein all the processings involved in the execution of a software are expressed in terms of combinations of the two different table operations or translations mentioned above.

By describing software in terms of the table translations as mentioned above, the software assumes a tree-like form (refer to FIG. 4). The tree trunk receives as the input data the tables corresponding to the leaves with the top table representing the output data, while branches represent softwares to be processed (or to undergo a table translation procedure). An intermediate table constituting the tree trunk represents the subordinative processing and can be handled as a component part, so to speak, for performing the subordinate processing.

BRIEF DESCRIPTION OF THE DRAWINGS

FIG. 9 is a view showing a format of a basic command described in a computer language used in the present invention;

FIG. 10 is a view for illustrating management commands described in the above computer language;

FIGS. 13A to 13G are views for illustrating the information related to the management functions performed by various management sections shown in FIG. 1.

DESCRIPTION OF THE PREFERRED EMBODIMENTS

Figure 1:
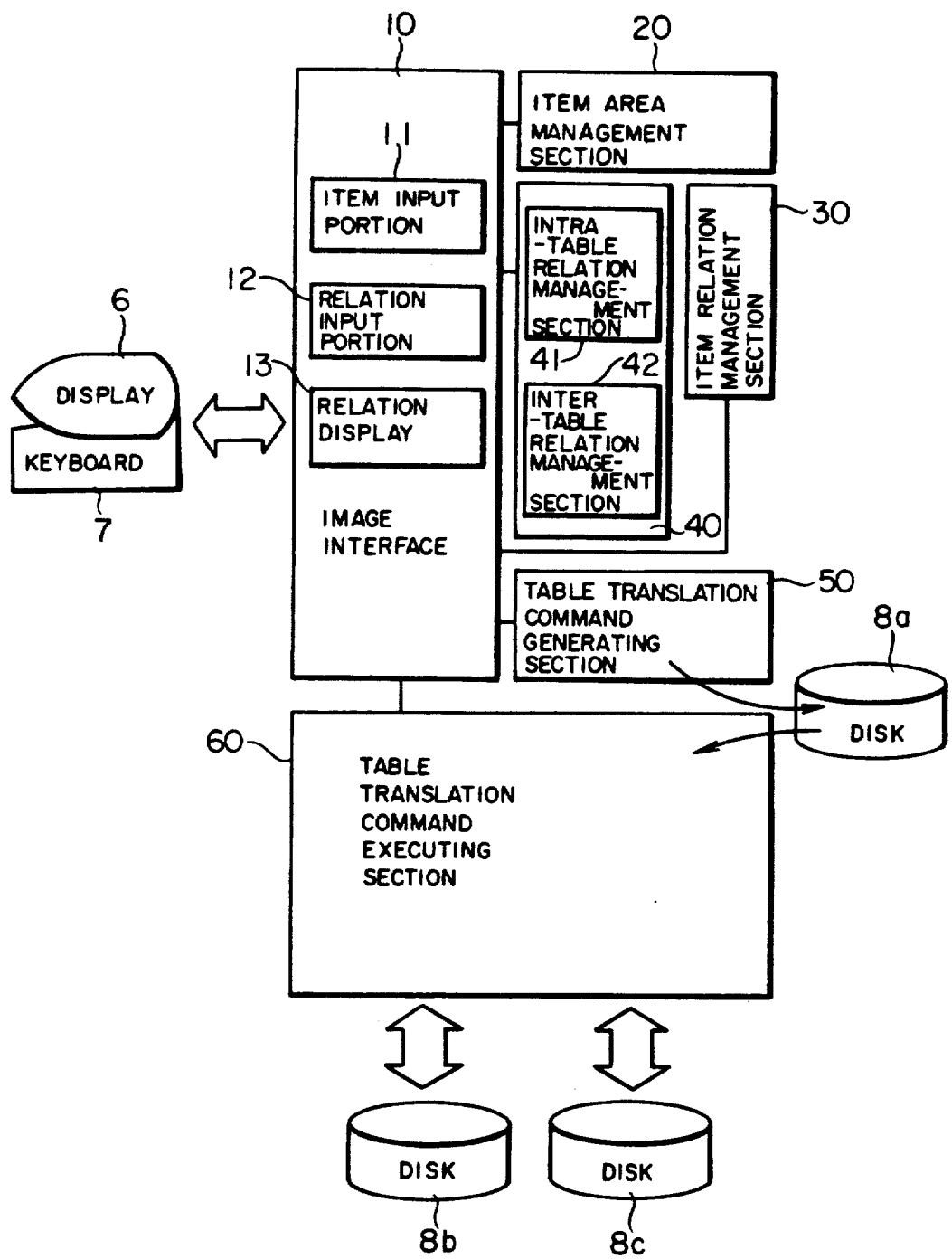
FIG. 1 is a view showing a software structure of a table translation software structuring system according to an embodiment of the present invention.
Figure 3A:
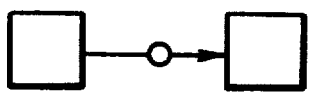
FIGS. 3A and 3B are views for illustrating the basic concept of the table translation.
Figure 3B:
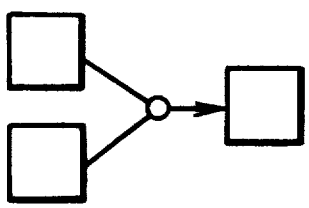
Figure 2:
FIG. 2 is a view for illustrating a layout of an input or output table employed in the table translation process to which the invention is applied.
Figure 4:
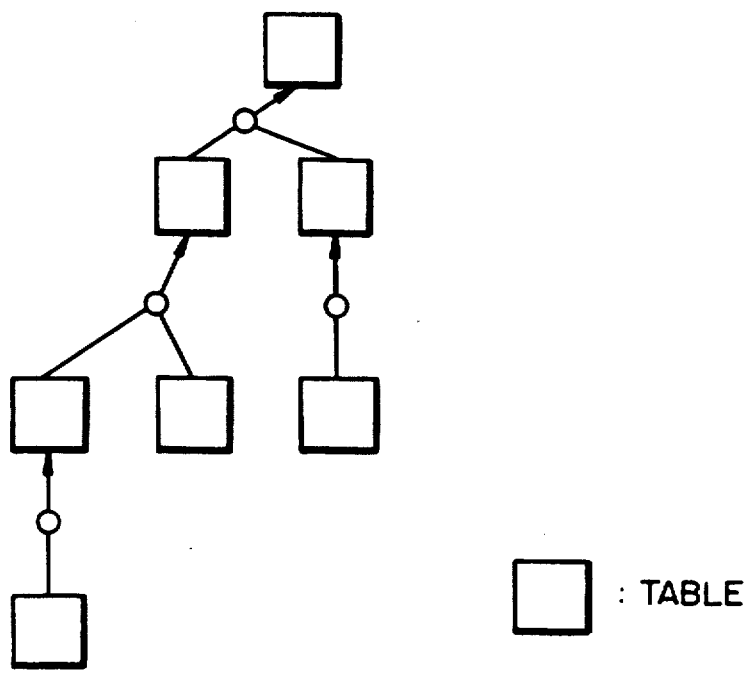
FIG. 4 is a view showing a tree diagram representing a software in terms of a table translation process.

Now, the invention will be described in detail in conjunction with preferred embodiments thereof by referring to the drawings.

Figure 5:
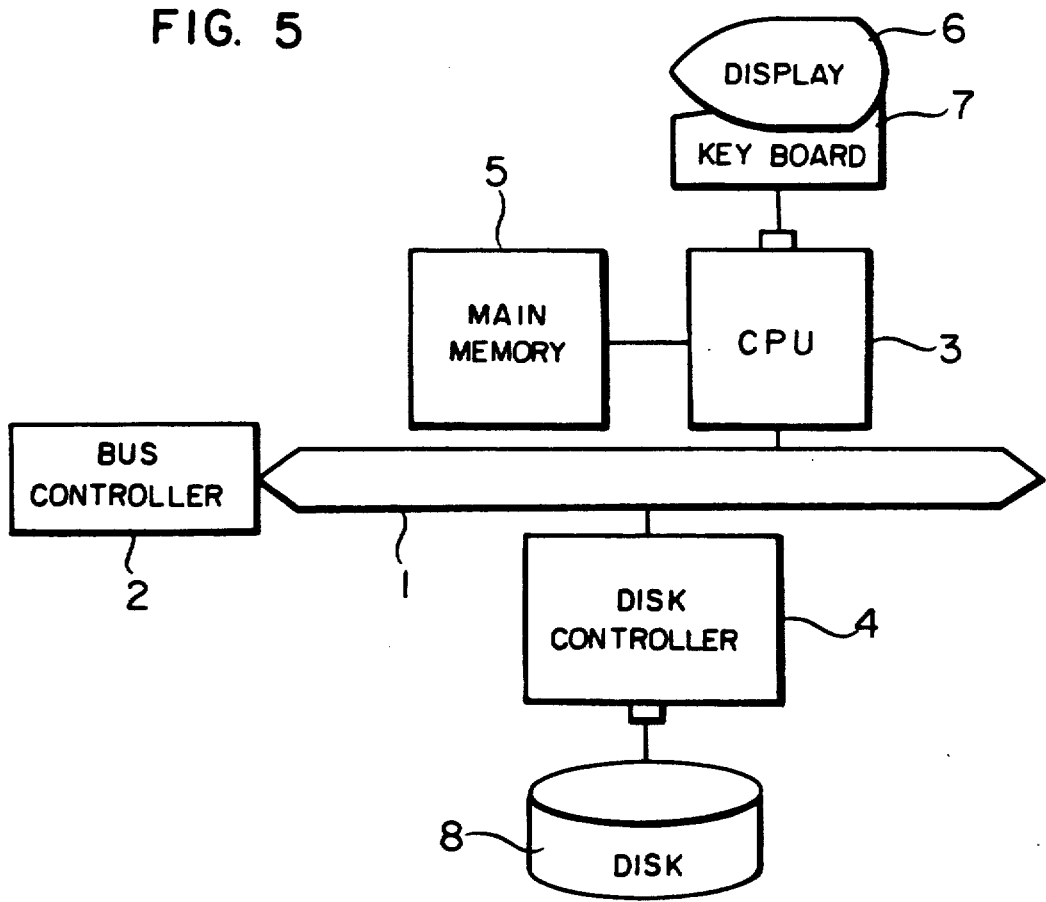
FIG. 5 is a block diagram showing schematically a hardware arrangement of a computer system operative with the table translation software structuring schema.
Figure 6:
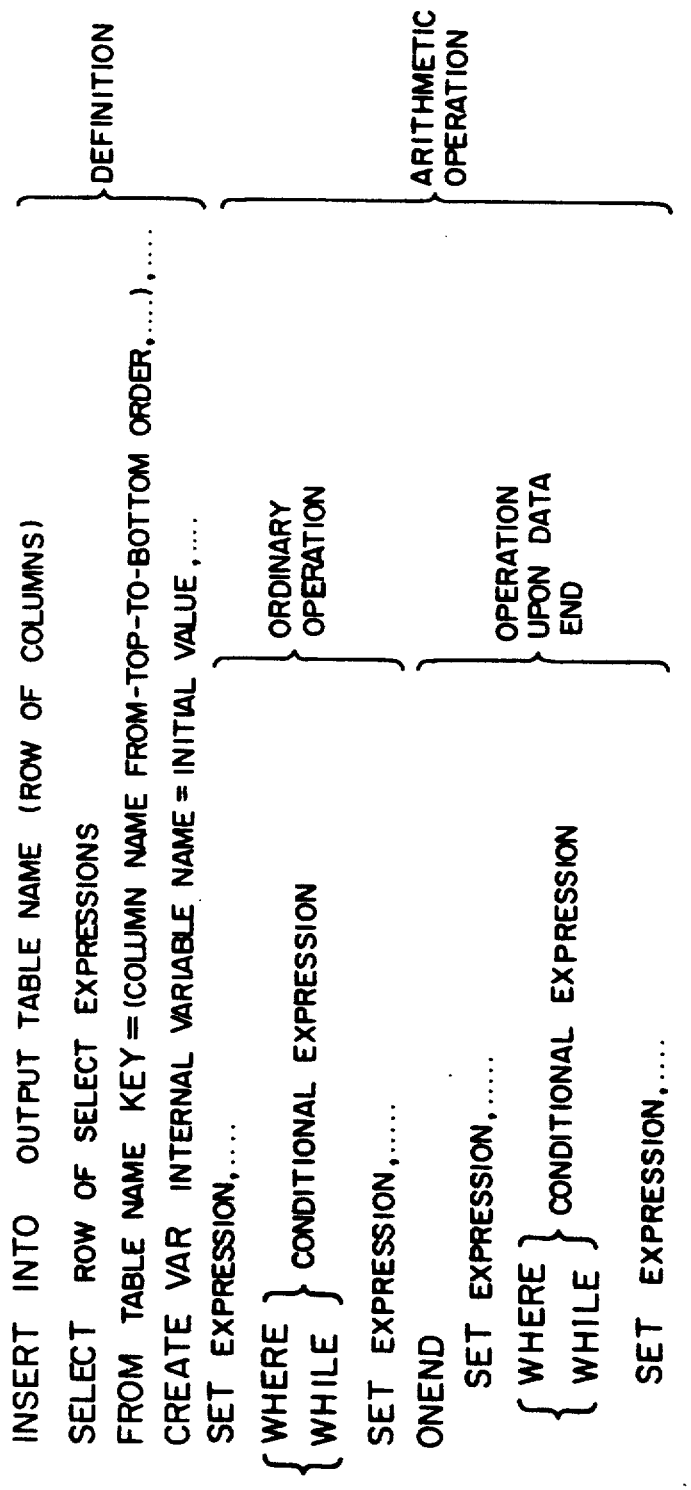
FIG. 6 is a view for illustrating a format for describing a table translation command created in the system shown in FIG. 5.
Figure 7:
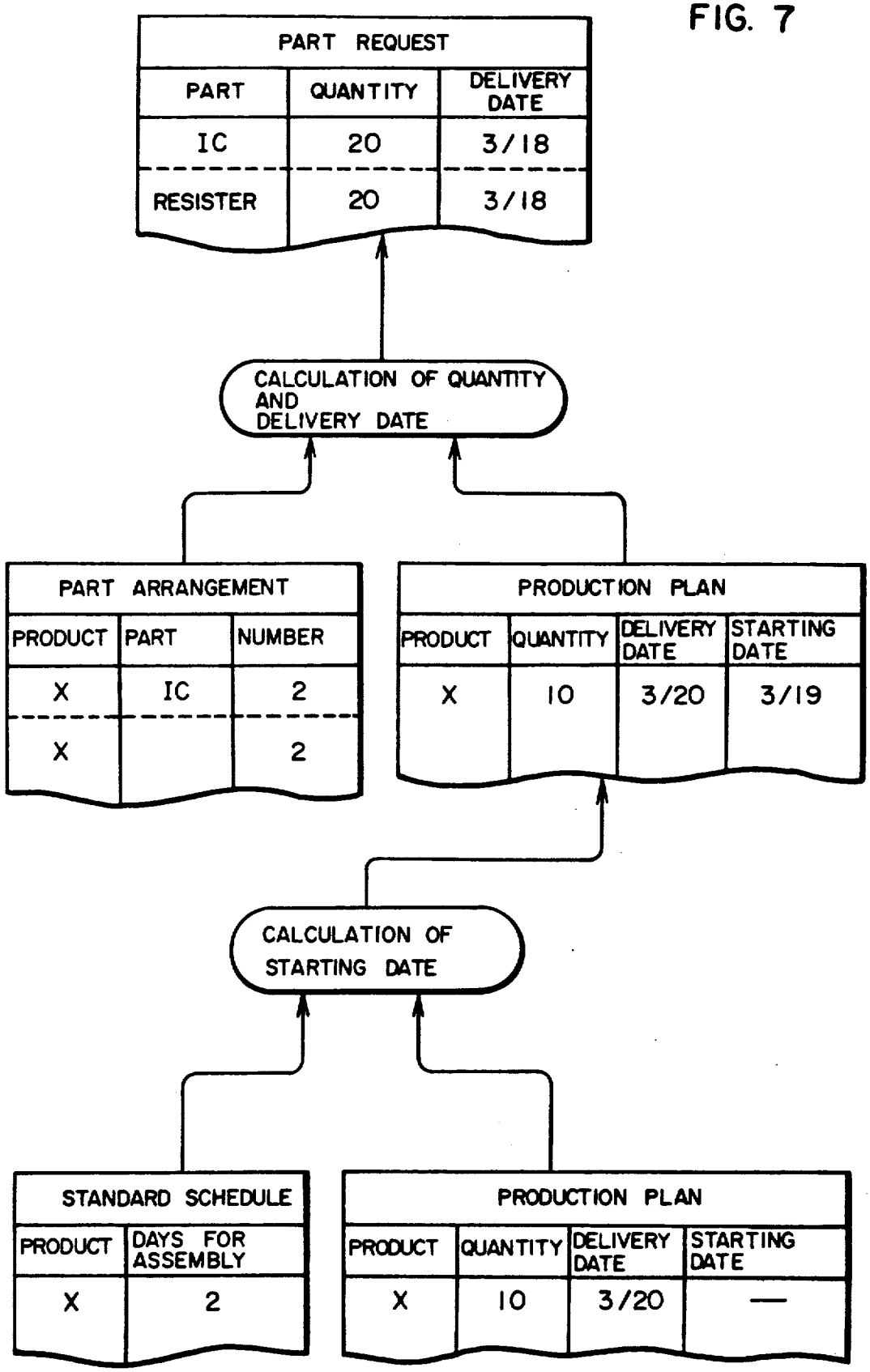
FIG. 7 is a view for illustrating a table translation process and shows an example of a part explosion procedure executed by the system shown in FIG. 5.
Figure 8A:
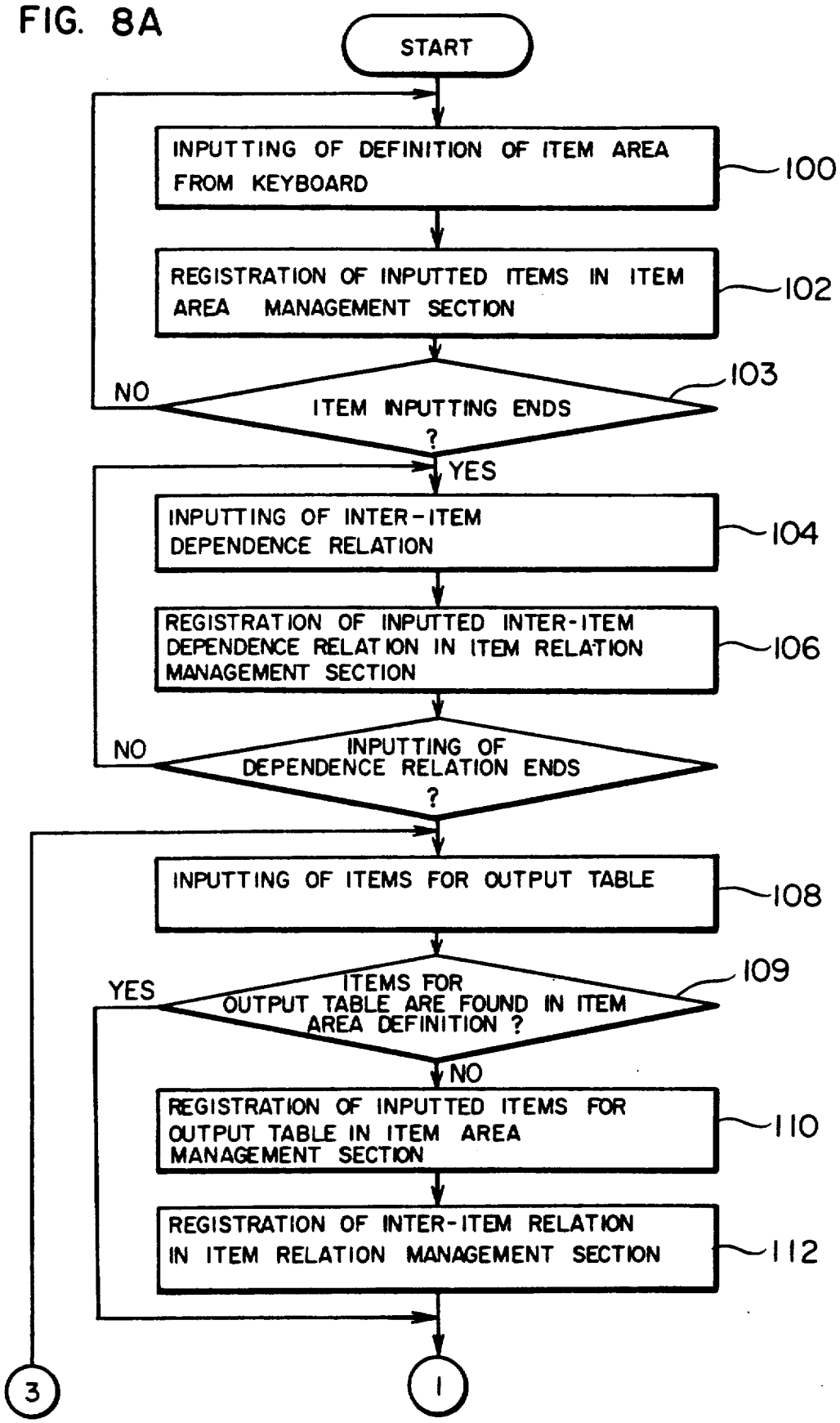
FIGS. 8A to 8C are views illustrating in flow charts a process executed by the system shown in FIG. 5.
Figure 8B:
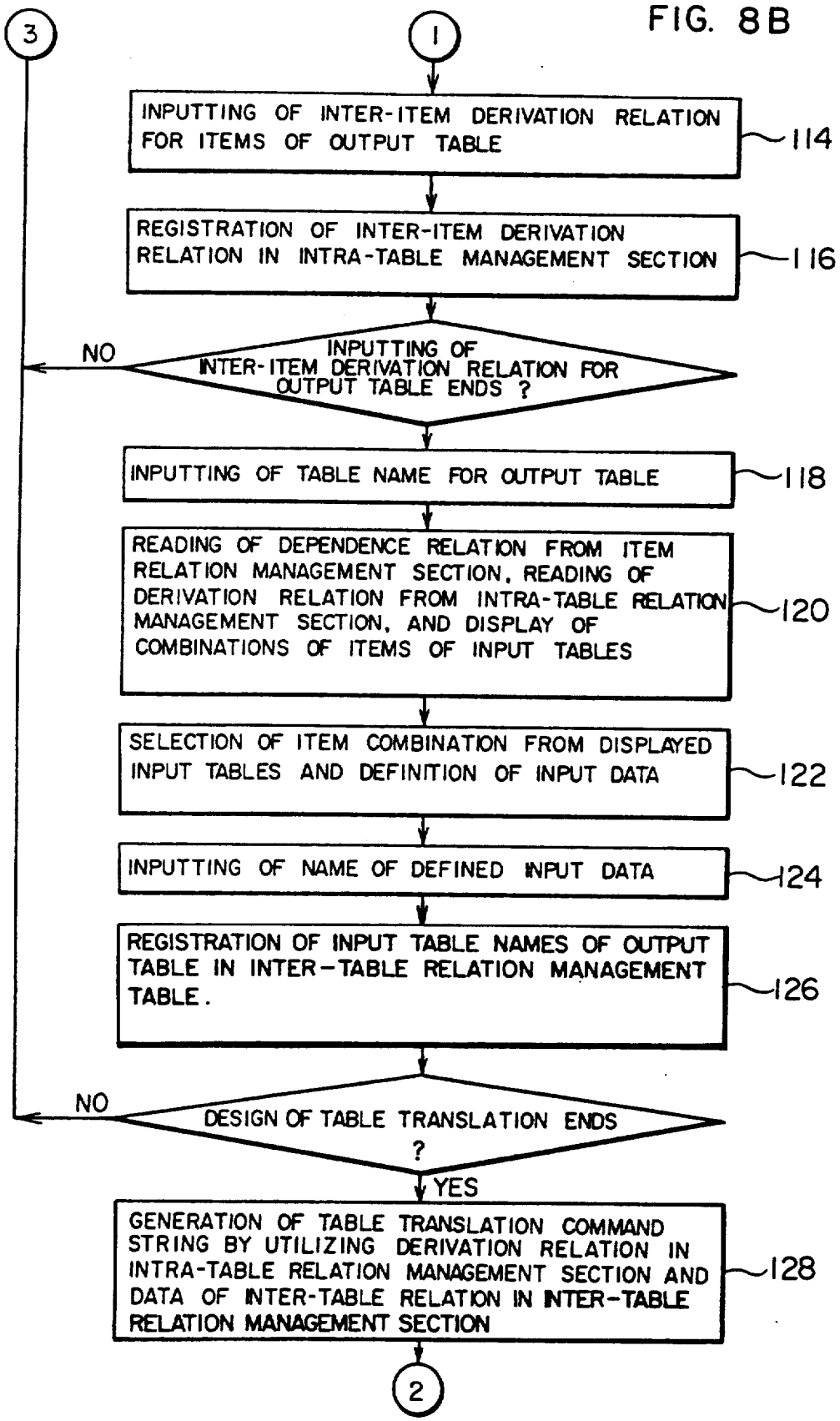
Figure 8C:
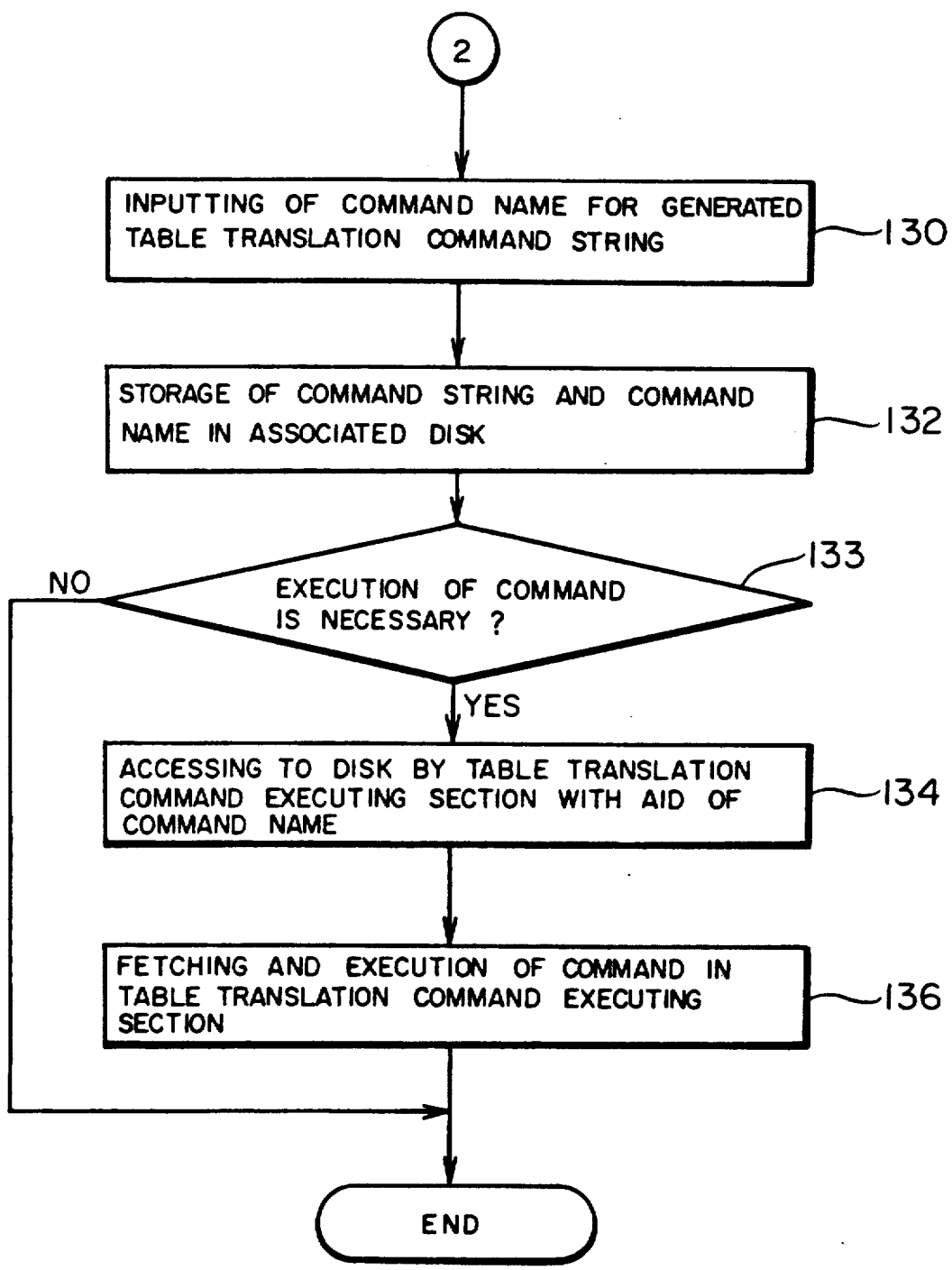

FIG. 5 is a view showing schematically in a block diagram a general arrangement of a hardware structure of a computer operative with a production management software developing system to which the table-translation software structuring method according to the present invention can be applied. FIG. 1 is a view for illustrating a software structure of the production management software developing system which can run on the computer system shown in FIG. 5. In this connection, it should be noted that the system shown in FIG. 1 may also be realized in a hardware structure. FIG. 6 is a view for illustrating the forms describing the table translation commands created by the production management software developing system according to the illustrated embodiment of the invention. FIG. 7 is a view for illustrating a table translation process adapted to be executed by the production management software designed and developed by the software structuring method according to the invention in conjunction with a part explosion procedure, by way of example. FIGS. 8A to 8C are views for illustrating in a flow chart a process executed by the production management software developing system.

Referring to FIG. 5, the computer for the production management software developing system is composed of a multi-bus 1, a bus controller 2 for controlling the multi-bus 1, a central processing unit or CPU 3 connected to the multi-bus 1, a disk controller 4, a main storage or memory 5, a display 6, a keyboard 7 and a disk 8 connected to the disk controller 4, wherein the main memory 5, the display 6 and the keyboard 7 are connected to the CPU 3. Data inputted through the keyboard 7 are fetched by the CPU 3 to be stored in the main memory 5 and displayed on the display unit 6. The data placed in the main memory 5 is sent to the disk controller 4 through the multi-bus 1 under the control of the CPU 3 and subsequently stored in the disk 8 from the disk controller 4.

Referring to FIG. 1, the production management software developing system under consideration includes in addition to the display unit 6, the keyboard 7 and the disks 8a, 8b and 8c (generally denoted by 8 in FIG. 5) mentioned above, an image interface 10, an item area management section 20, item/relation management section 30, a table relation management section 40, a table-translation command string creating section 50, and a table-translation executing section 60. The image interface 10 includes an item input portion 11, a relation input portion 12 and a relation indicating portion 13, while the table relation management section 40 is constituted by an intra-table relation management portion 41 and an inter-table relation management portion 42.

The table translation command string generating section 50 serves to convert or translate a table translation process designed by the production management software developing system into a table translation command string which may comply with the description format illustrated in FIG. 6, by way of example. The table translation command string is then stored in the disk 8a. In this regard, it should be mentioned that the table translation commands illustrated in FIG. 6 are expressed by a computer language developed by the assignee of the present application, and bear similarity to a description format of the relational type data base language. More specifically, this language has a structure based on the relational type data base language SQL (an abbreviation of Structure Query Language) recommended by the International Organization for Standardization (ISO).

In the following, this computer language will be elucidated by referring to FIGS. 9 and 10, wherein FIG. 9 illustrates basic commands employed in this language and FIG. 10 illustrates commands for management.

The commands allowed to be described in a definition area are the basic commands illustrated in FIG. 9. The production management functions are described in terms of these commands in this language. The purpose, contents and the intended applications of this language are mentioned below.

1. Purpose

In view of the present state of the art in which an increased number of steps are required for developing software for a production or factory management system indispensable for high-efficiency operation of a factory automation system, the purpose of this language is to enhance the productivity of the production management software and make possible the stepwise extension of the production management software. To this end, this language is structured on the basis of the relational type data base and suited for production or factory management, regardless of the type of data.

2. Structure

The language is composed of two types of command groups mentioned below so as to be easily understood by those in charge of production management who are not always required to have adequate knowledge about the computer technology.

(1) Basic commands for describing logics of production management software (refer to FIG. 9). 37 types of commands including UPDATE and so forth are available.

(2) Management commands given in terms of parts representative of functions adopted in standard production managements (refer to FIG. 10). 34 types of commands such as EXPLODE and others are available.

Through combinations of these commands, language which can be easily understood as compared with the hitherto known languages (COBOL, FORTRAN) can be realized and the number of steps required for creation of software for production management can be remarkably decreased. (In reality, in a practical application, it has been found that the number of steps can be decreased by a factor of 1/15.)

3. Intended Applications

This language is intended for the processing of data in the form of a table which forms a major proportion of the various production management softwares. The matter in concern is primarily such kinds of data processing in which tables on file are inputted for executing relatively simple calculations, the results of which are returned to the file in the form of output tables. This language is capable of flexibly describing softwares which are subjected to the phased increase in their scales and to the phased modification.

It should be added that the language of concern has been developed starting from the standpoint that the data processing through the production management software may be regarded as a process for translating an input table to an output table and is characterized by the capability of easily describing the table translation. Further, this language is intended to be applied to such data processing in which a table in files occupying a major part of the production management software are inputted for performing relatively simple calculations and the output tables containing the results of the calculation are returned to the associated files. This language can be easily understood as compared with the conventional languages (COBOL, FORTRAN) and the number of steps for creating a production management software can be decreased by a factor of 1/15. At present, production management command MIMS is commercially available from GE Co. Ltd., MIMS is however limited to particular applications and lacks flexibility (e.g. the contents of commands can not be altered or modified). Further, a relational type data base retrieving language bearing a similarity to the table translation function is known. However, MIMS can not be used for describing the logic involved in production or factory management.

Turning to FIG. 1, the table translation executing section 60 fetches therein the table translation commands stored in the disk 8a and executes sequentially the table translation commands.

Figure 11:
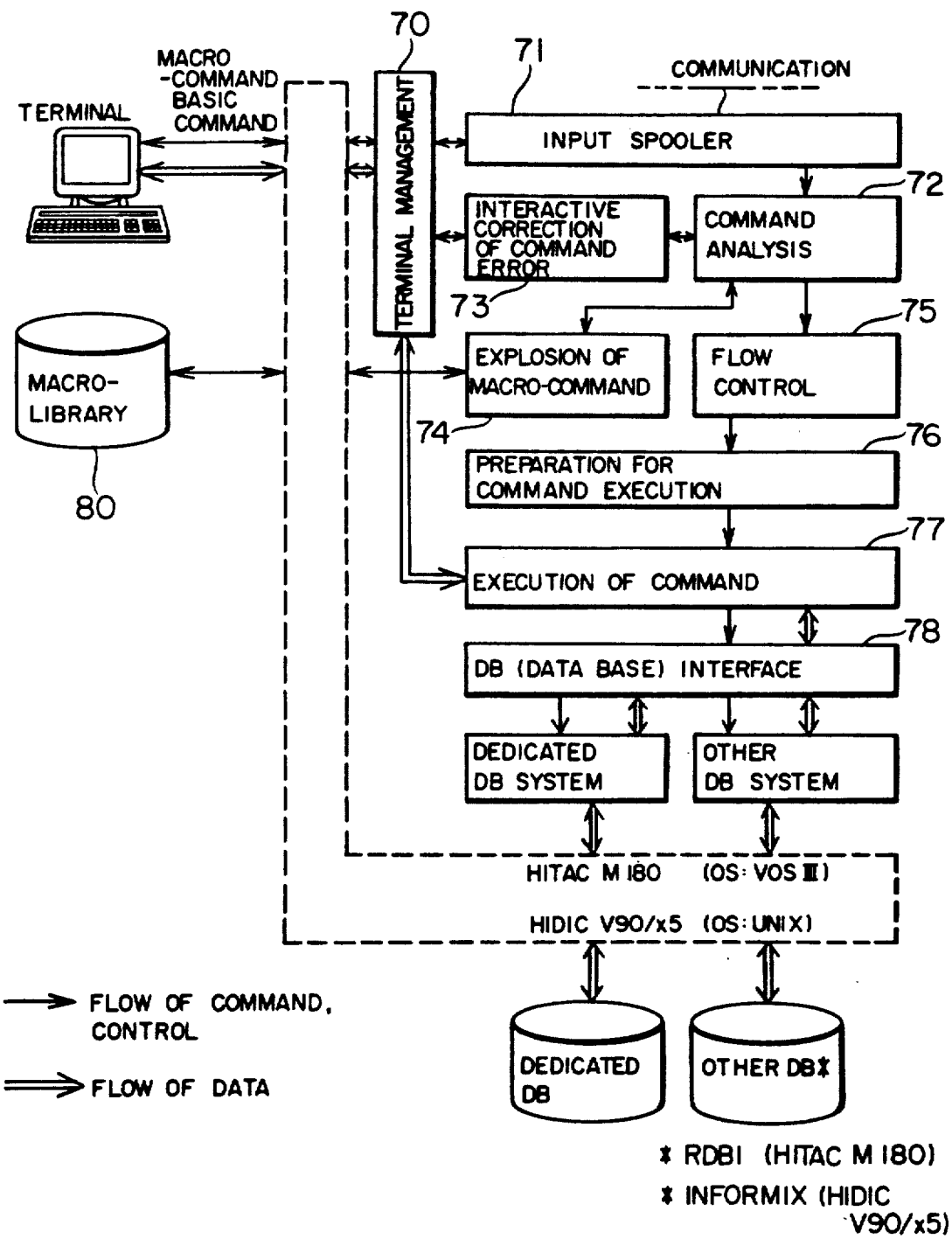
FIG. 11 is a view for illustrating a program structure of a table translation command executing section shown in FIG. 1 on the assumption that the above computer language is used.

FIG. 11 shows a structure of a program executed by the table translation executing section 60 by using the language described above. Referring to FIG. 11, macro-command and basic commands as inputted are once placed in an input spooler 71, wherein the commands on the spooler are sequentially executed through command analyzing procedure. Functions of the various blocks shown in FIG. 11 are summarized below:

(1) Terminal management 70: Management of input/output in terminals.

(2) Input spooler 71: Temporary storage of commands inputted from the terminals. By providing the spooler 71, data input can be carried out as occasion requires. (Data input is allowed even when a command is being executed.)

(3) Command analysis 72: Reading the commands from the spooler 71 one by one for identifying the type of the commands.

(4) Interactive correction of error command 73: When error is found in description of the command analyzed through the command analysis 72, a request for correction of error is issued to the operator or designer through the terminal managing section 70. After correction, the corrected command is allowed to be again executed.

(5) Explosion of command 74: When a command is found to be a macro-command (a combination of elementary or basic commands) through command analysis 72, this function is activated to read out a corresponding macro-command from a macro-library 80 to explode it into a string of basic commands. The macro-library 80 functions to create the macro-command required by the user for registration therein.

(6) Flow control 75: This function is activated when commands for controlling the flow (e.g. "if", "while", "repeat" etc.) are found through command analysis 72, to thereby control the sequence in which commands in a string are executed.

(7) Command execution preparation 76: Commands are translated into internal code of table format so that the command execution is facilitated.

(8) Execution of command 77: Function of command is executed in accordance with the internal code resulting from the translation effectuated through the command execution preparations 76.

(9) DB interface 78: Reading out of data required for the command execution preparation from various data bases (DB) on the record-by-record basis and storage of data.

Now, assuming that a design engineer of a production management software develops a software for certain production management with the aid of the production management software developing system, the function of part explosion which is one of the functions necessary for the production management will be described by referring to the flow chart shown in FIG. 8. With the term "part explosion", it is intended to mean the function for arithmetically determining or calculating the quantity or number of component parts and a period (time span) required for manufacturing a designated quantity (or number) of products till an appointed date of delivery in accordance with a scheduled production plan.

The function of part explosion may be expressed in terms of a process of table translation as illustrated in FIG. 7. At first, a production plan table containing items concerning the product, quantity, the date of delivery and the production starting date is inputted together with a standard schedule table listing the product and the number of days required for the production to determine the start date which has been pending until then, and a production plan table is outputted. Subsequently, the production plan table is inputted together with a part arrangement table listing the items concerning the product, part and the number of parts whereby a part request table listing items concerning the product, quantity and the appointed date of delivery is outputted.

The production management software developing system is so arranged as to design and develop the production management software in terms of a process of table translations. More specifically, with the aid of the production management software developing system, an engineer in charge of designing a production management software may execute the table translation process in the manner described below.

At first, a command requesting the indication or display of the item area defined at an instant in time is inputted by manipulating the keyboard shown in FIGS. 1 and 5. The inputted command is displayed on the display 6 under the control of the CPU 3, and at the same time sent to the image interface 10 shown in FIG. 1. Upon receipt of this command, the image interface 10 reads out the item area defined already from the item area management section 20 to display the area on the display unit 6. It is assumed that at this point in time, no definition has been made yet. On this assumption, the software engineer inputs from the keyboard the data concerning the product, the number of days taken for production, quantity, the date of delivery, component parts and the number thereof which are required for loading the production plan table, the standard schedule table and the part arrangement table which are necessary for defining the table translation process representative of the part explosion (step 100 in FIG. 8A). The input items are registered in the item area management section 20 as an item definition area by way of the item input portion 11 incorporated in the image interface 10 (step 102). When the inputting of the items ends (step 103), an inter-item dependence relation providing fundamental information for preparing the input table is inputted (step 104). In other words, the software engineer operates the keyboard 7 to input the information representative of the presence of a dependence relation between the product and the number of days required for the production thereof. This relation is expressed by "Product→the Number of Days". In this connection, the presence of the dependence relation between "Product" and "The Number of Days" means that when a product (code) is determined, the number of days for realizing that product can be determined definitely. Accordingly, the table listing the product and the number of days for realizing the product can be prepared with the product code being used as a key code. The inter-item relationship "Product→The number of Days" inputted from the keyboard 7 is registered in the item relation management section 30 through the relation input portion 12 incorporated in the image interface 10 (step 106). In a similar manner, the inter-item relations conceived by the designer, i.e. "Product→Quantity", "Product→Date of Delivery", "Product→Start Date" and "Product/Parts→Number of Parts" can be registered in the item relation management section 30 (step 104). When the inter-item relation is being inputted, the software developing system checks whether the items participating in the relation being inputted, e.g. the items "Product" and "Quantity", are already defined in the item area management section 20. If the items are not yet defined, information of input error or necessity of additional definition is displayed on the display unit 6 to prompt the designer to make a decision or other appropriate processing. Further, every time the relation is inputted, the system checks as to the possibility of contradiction. If contradiction is detected, the system prompts the operator to repeat the inputting operation.

Next, description will be made on the table translation for performing the calculation to determine the job starting date shown in FIG. 7. The software designer inputs the items of the production plan table which constitutes an output table and the inter-item relations (step 108 in FIG. 8A). More specifically, the designer operates the keyboard 7 to input the items concerning the product, quantity, date of delivery and the production starting date. The image interface 10 checks as to whether every input item has already been registered in the item area management section (step 109) and fetches all the dependent relations relevant to the item from the item/relation management section 30 to display them on the display unit 6. When there is an input item which has not yet been registered, that item is registered in the item area management section (step 110), while the relevant inter-item relations are registered in the item relation management section (step 112). Subsequently, the designer inputs the derivation relations between the items (i.e. the sequential relationship in which the items are arithmetically processed from the keyboard 7 (step 114). The inputted inter-item derivation relation is transferred to the table relation management section 40 to be registered in the intra-table relation management section 41 through the image interface 10 (step 116). By way of example, consideration is given to the item of the production starting date. Upon inputting the item of the production starting date from the keyboard 7, the image interface 10 confirms that data has been defined in the item area management section 20 (i.e. the designer has already inputted that item as the item area definition) and displays the dependence relation "Product—Start Date" on the display unit 6.

Subsequently, the designer operates the keyboard 7 to input the derivation relation of the production starting date which can be expressed as follows:

(Product→) Start Date:=(Product→) Delivery
Date—(Product→) Number of Days+1    (1)

where the symbol ":=" represents that the left-hand side of the expression is arithmetically determined in such a manner as indicated by the right-hand side. The derivation relation concerning the date of start (start date) is registered in the intra-table relation management section 41 through the image interface 10. The derivation relations for the product, quantity and the date of delivery can be expressed as follows:

(Product→) Product:=(Product→) Product    (2)

(product→) Quantity:=(Product→) Quantity    (3)

(Product→) Delivery Date:=(product→) Delivery Date    (4)

Subsequently, the name of the output table is inputted (step 118). The image interface 10 fetches from the item relation management section 30 the dependence relations concerning the product, quantity, delivery date and the start date while fetching the derivation relations from the intra-table relation management section 41 for determining the input table on the basis of the inter-item relations contained in the output table. By selecting the items required for the input table on the basis of the dependence relations and the derivation relations, the image interface displays combinations for the input table which can be adopted (step 120). For example, the display 6 may display the following combinations:

a: (Product, Quantity, Delivery Date, Number of Days)

b: (Product, Quantity, Delivery Date) (Product, Number of Days)

Either of the combinations a or b provides no problems as to the software function. For the data management, the designer selects either one of the combinations a or b (step 122). It is assumed that the combination b is selected, and the item "start Date" is added to the combination (Product, Quantity, Delivery Date) so as to have a table structure common to the production plan table which is the output table. Thus, a table listing the items "Product", "Quantity", "Delivery Date" and "Starting Date" constitutes the production plan table, while the table listing the items "Product" and "Number of Days" constitutes the standard schedule table. In this manner, the designer can select a combination of the items by observing the display 6 and making additional modifications. Thereafter, the designer inputs the name of the input table from the keyboard (step 124). The selected combination and the table name as inputted are registered in the intra-table relation management section 41 through the image interface 10 and an inter-table relation indicating that the production plan table and the standard schedule table are input tables of a production plan table is registered in the inter-table relation management table 42 through the image interface 10 as well (step 126). On the basis of the inter-item derivation relation registered in the intra-table relation management section 41 and the inter-table relation registered in the inter-table relation management section 42, the table translation for determining the production starting date can be expressed as shown in FIG. 7.

Next, the table translation for calculating the quantity and the date of delivery will be described by referring to FIG. 7. As in the case of the calculation of the production starting date, items "Part", "Quantity" and "Delivery Date" required for the output table are inputted, which is followed by the inputting of the dependence relations ("Part"→"Quantity" and "Part"→'-'Delivery Date") as well as the inter-item derivation relations mentioned below:

$$(\text{Part}\rightarrow)\ \text{Quantity}:=(\text{Product}\rightarrow) \quad \text{Quantity}\times(\text{Product Part}\rightarrow)\ \text{Number of Parts} \qquad (5)$$

$$(\text{Part}\rightarrow)\ \text{Delivery Date}:=(\text{Product}\rightarrow)\ \text{Start date}-1 \qquad (6)$$

These relations are registered in the intra-table relation management section 41. The designer selects one of the input table combinations displayed on the display unit 6 and inputs the names of the input and output tables i.e., the production plan table, the part arrangement table and the part request table, which are registered in the inter-table relation management section 42.

As will be appreciated from the foregoing description, it is possible to express the part explosion "PART (EXPLODE)" in terms of the table translation for determining the production starting date and the table translation for determining the quantity and the date of delivery.

Now, the designer can operate the keyboard 7 to input a command for generating the command string for the part explosion. The command for generating the command string is sent to the table translation command generating section 50 through the image interface 10. In response, the table translation command string generating section 10 fetches information concerning the table translation process for the part explosion from the intra-table relation management section 41 and the inter-table relation management section 42, to create the command string for the part explosion (step 128). In the following, description will be made on the creation or generation of the table translation command string in conjunction with the part explosion, by way of example.

Figure 12:
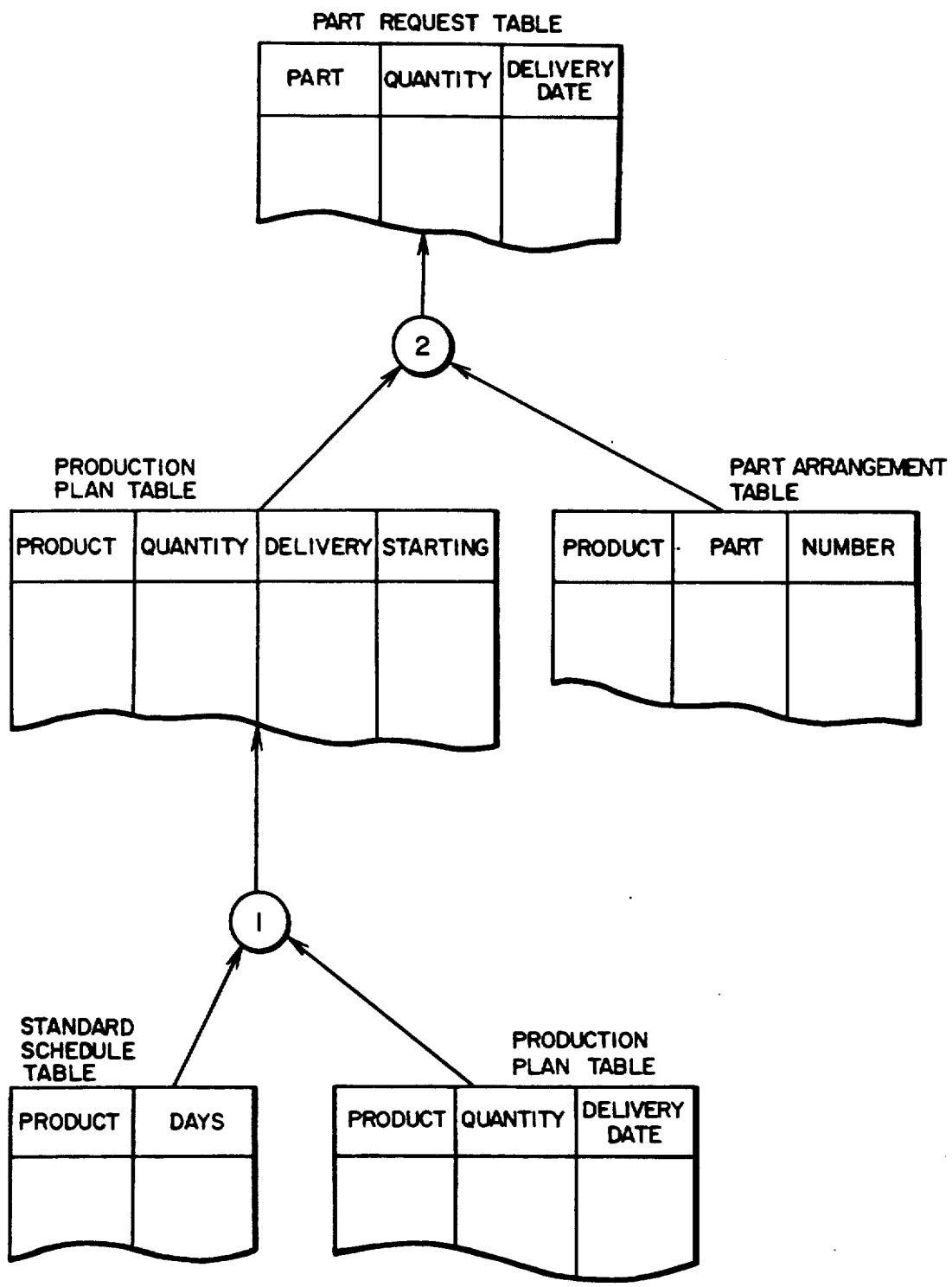
FIG. 12 is a view for showing an example of the part explosion procedure in a tree-like software structure.

The table translation command string generating section 50 serves to transform the software designed already into a format capable of being executed by the executing section described hereinbefore. More specifically, the table translation command string generating section 50 fetches the name of the input table, the items contained therein and the required inter-table relation from the inter-table relation management section 42, while fetching the derivation relation of the items contained in the output table from the intra-table relation management section 41, to generate the table translation command string in accordance with the format of description of command shown in FIG. 6. As mentioned hereinbefore, with the phrase "part explosion function", it is intended to mean the function of calculating the quantity of parts and the time required for manufacturing a designated number of ordered products till the date of delivery in accordance with the scheduled production plan. (This function may also be referred to as the explosion of required quantity.) More specifically, the function of part explosion (EXPLODE) can be expressed in terms of transition process of the table-formated data, as illustrated in FIG. 12. Referring to the figure, at a level 1, the production plan table containing the items "Product", "Quantity" and "Delivery Date" is inputted together with the standard schedule table containing the items "Product" and "Number of Days", wherein the production start date is determined for the product listed in both of the tables inputted in accordance with the expression (Start Date:=Delivery Date—Number of Days+1). The result of calculation is placed in the column labelled "Start Date" of the production plan table. At a level 2, the production plan table and the part arrangement table containing the items "Product", "Part" and "Part Number" are inputted, whereby the required quantity of parts is determined for the product listed in both of the inputted tables in accordance with (Required Quantity of Parts:-=Quantity×Number of Parts), and the date of delivery is determined in accordance with (Delivery Date=-Start Date—1). Thus the required part table containing the items "Part", "Quantity" and "Delivery Date" is prepared. In this manner, the part explosion function resides in preparation of the part request table on the basis of the production plan table, the standard schedule table and the part arrangement table.

The part explosion can be expressed in terms of a tree-like software architecture, as will be seen in FIG. 12, and provides the design information described hereinbefore and illustrated in FIGS. 13A to 13F.

FIGS. 13A to 13F are views illustrating the management functions carried out by the various management sections 20, 30, 40–42 and 50 shown in FIG. 1. More specifically, FIG. 13A shows the table management for managing all the tables used by the system. FIG. 13B illustrates the item management for managing attributes and lengths of all the items used in the system. FIG. 13C illustrates the intra-table relation management for managing the item constituting the table used by the system. FIG. 13D shows the inter-table relation management for managing the derivation relations among the tables used by the system. FIG. 13E shows the inter-item relation management for managing the derivation relations among the items. FIG. 13 shows the item area management. FIG. 13G shows the inter-item dependent relation management for managing dependencies among the items.

The processing (table translation) at the level 1 shown in FIG. 12 can be expressed or described with the aid of the tables shown in FIGS. 13A to 13F in the manner mentioned below:

Through the processing at level 1, the production starting date is determined from the standard schedule table and the production plan table, whereby the production plan table containing the item "Start Date" is prepared. The intra-table relation management section has registered therein as the items the standard schedule table and the production plan table, as shown in FIG. 13C. From the inter-table relation management shown in FIG. 13D, it can be seen that the production plan table mentioned above is prepared from the subordinative production plan table and the standard schedule table. Further, it is shown that the key item used is "Product". From the inter-item relation management shown in FIG. 13E, it can be seen that the date of starting the production is determined in accordance with (Delivery Date−Number of Days+1). The intra-table relation management shown in FIG. 13C holds information concerning the tables to which the individual items should belong. Further, the item management shown in FIG. 13B contains information concerning the attributes and the lengths of the various items. In this conjunction, it will be noted that the attributes and lengths of data provide important factors in development of software.

The processing at level 2 shown in FIG. 12 is also described in the tables shown in FIGS. 13A to 13F. Since this processing will be readily understood by considering the above description, further elucidation will be unnecessary.

Through the processing and procedure described above, the command string generating section creates or generates the command for the part explosion (EXPLODE).

More specifically, the processing at level 1 outputs the production plan table which also serves as the input table, as will be seen from the table management shown in FIG. 13A. At this time point, a command "UPDATE" is generated. Subsequently, the production plan table is extracted from the column "Derived Table" of the intertable relation management shown in FIG. 13D and decision is made to the effect that the input tables for the preparation of this production plan table are the subordinative production plan table and the standard schedule table and that the key item is "Product". Next referring to the inter-item relation management shown in FIG. 13E, it is decided that determination of the production starting date requires calculation according to (Delivery Date−Number of Days+1). On these conditions, the command "EXPLODE" mentioned below is generated.

```
EXPLODE:
UPDATE Production Plan Table, KEY = "Product ∞
UPDATE Standard Schedule Table, KEY = "Product"
SET Date of Start = Delivery Date − Number of Days + 1
  ... (1)
INSERT INTO Part Request Table (Product, Quantity, Delivery Date)
SELECT Part, Quantity × Number of Parts, Start Date − 1
```

```
-continued
FROM Production Plan Table, KEY = "Product"
Part Arrangement Table, KEY = "Product" ... (2)
END:
```

For defining information of the production plan table, standard schedule table, part request table and the part arrangement table which are required for executing the above mentioned command "EXPLODE", following commands are also generated.

| CREATE TABLE: | Production Plan Table (Product C8, Quantity I4, Delivery Date I4, Start DAte I4) ... (3) |
|---|---|
| CREATE TABLE: | Standard Schedule Table (Product C8, Number of Days I4) ... (4) |
| CREATE TABLE: | Part Arrangement Table (Product C8, Part C8, Number of Part I4) ... (5) |
| CREATE TABLE: | Part Request Table (Part C8, Quantity I4, Delivery Date I4) ... (6) | where "C8" means that the attribute is a character string (C) having a length of 8 bytes, and "I4" means that the attribute is an integer having a length of 4 bytes.

A string of table translation commands are created, as described above. Subsequently, the names of created commands are inputted (step 130). The string of the created table translation commands is stored in the disk 8a (step 132). When necessity of executing the table translation command arises in the system (step 133), instruction for executing that command is inputted from the keyboard 7. As a result, the table translation command executing section 60 is activated to fetch the desired command from the disk 8a (step 134) to allow the command to be executed (step 136).

Figure 14:
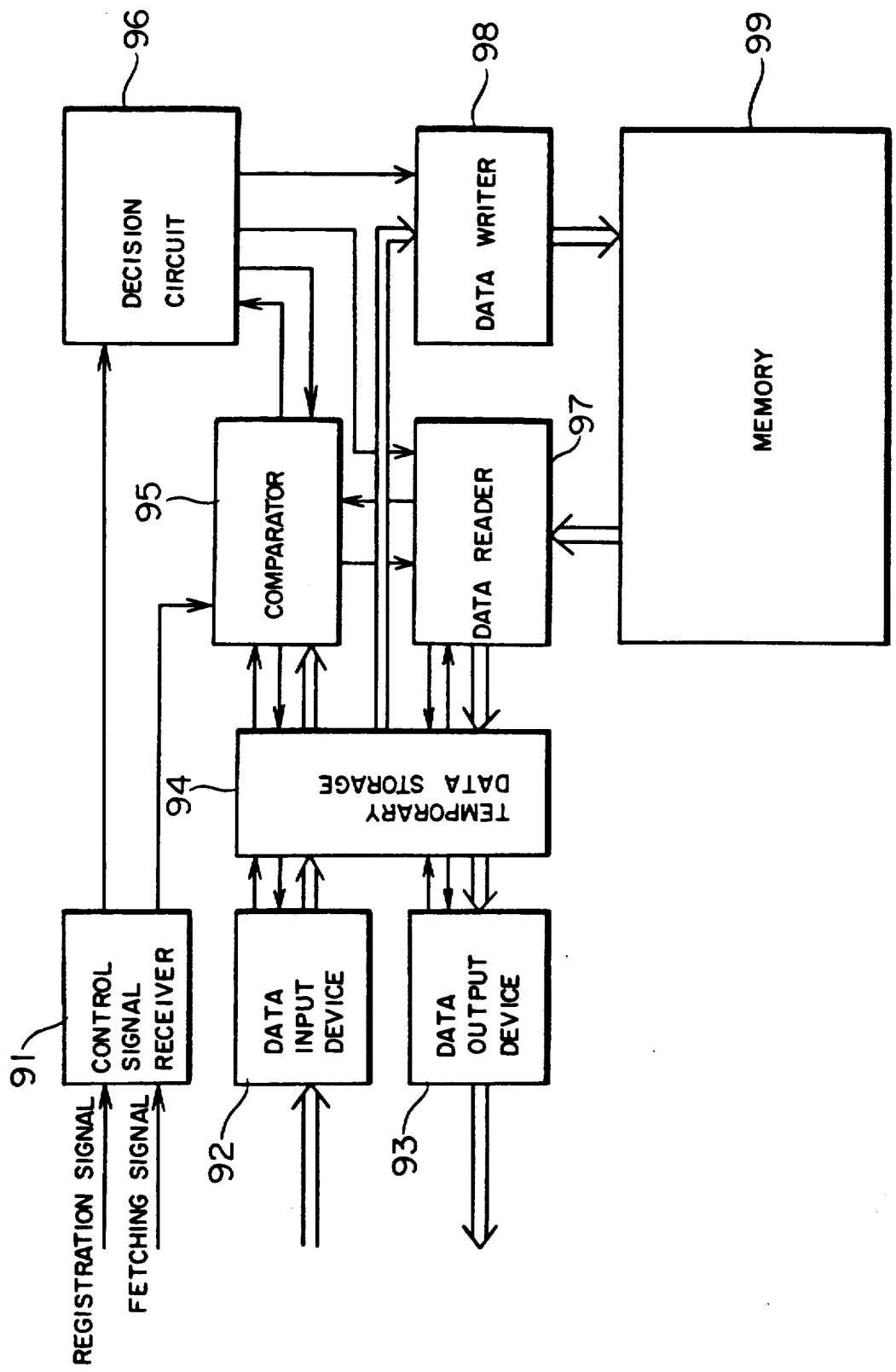
FIG. 14 is a block diagram showing a hardware structure of an intra-table relation management section shown in FIG. 1.

FIG. 14 shows in a block diagram a circuit arrangement of the intra-table relation management section 41 assumed to be implemented in hardware. It should be understood that the item area management section 20, the item relation management section 30 or the intertable relation management section 40 can also be realized in a similar circuit configuration.

Operation of the circuit shown in FIG. 14 will be described below.

(1) Registration in intra-table relation management

A control signal receiver 91 receives a registration signal, and a data input circuit 92 receives data to be registered. Assuming, for example, that the production plan table is to be registered, the input data includes the table name (i.e. Production Plan Table) and the column name (i.e. Product, Quantity, Delivery Date and Production Start Date) and is given in the form of a character string obtained by coding "Production Plan Table (Product, Quantity, Delivery Date, Production Start Date)". The data received by the data input circuit is transferred to a temporary data storage 94. In response to the output signal of the control signal receiver 91, a comparator 95 operates to compare the input data (i.e. data to be registered) with the data stored in a memory 99 for determining the order of registration to be registered. The data in the memory 99 is fetched by a data reader 97 in dependence on the output signal from the comparator 95 to be subsequently transferred to the temporary storage 94. Every time the data is fetched from the memory 99, a confirmation signal confirming the data fetch is supplied to the comparator 95 and the temporary data storage 94 from the data reader 97. The result of comparison performed by the comparator 95 is supplied to a decision circuit 96 in the form of ON or OFF signal. Further, the decision circuit 96 receives the registration signal from the control signal receiver 91 to decide the location where the input data is to be registered in dependence on the combination of the signal output from the comparator 95 and the registration signal. The decision circuit 96 outputs a signal representative of the result of the decision, which signal is supplied to the comparator 95 and a data writer 98. The comparator 95 responds thereto to stop operation, while the data writer 98 receives data from the temporary data storage 94 and writes the data in the memory 99.

(2) Fetching of data

The control signal receiver 91 receives a fetching signal, while the data input circuit 92 receives the data signal indicative of the table name. The data received by the input circuit 92 is transferred to the temporary data storage 94. The control signal receiver 91 outputs a signal indicating the fetching of data, which signal is supplied to the comparator 95 and the decision circuit 96. The comparator 95 supplies a signal to the data reader for reading out the data from the memory 99, the data read out being stored in the temporary data storage 94. This data is compared with the input data. The result of the comparison is supplied to the decision circuit 96 which in turn outputs a signal representative of the result of decision made with reference to predetermined criteria, the output signal being sent to the data reader 97. The latter reads out data from the memory 99 and sends the data to the temporary data storage 94, which data is then supplied to a data output circuit 93 to be outputted externally.

As will be appreciated from the foregoing description, a producton management software can be designed with an improved efficiency because the data structurization can be accomplished in parallel or simultaneously with the processing of data according to the present invention. Further, since the table translation commands can be created in the course of executing the table translation, improved correspondence can be realized between the design concept and the developed software.

With such arrangement that data structurization and processing are dealt with identically or integrally with the process of table translation in the designing and developing of software, the present invention brings about significant advantages mentioned below.

(1) The method of designing and developing software according to the invention well coincides with the human's thinking process of determining the processing procedure and data structure sequentially. Thus, the design efficiency can be drastically enhanced as compared with the hitherto known method according to which the processing procedure is designed or determined only after the structure of data has been established.

(2) Program can be created in the course of the table translation. Thus, the software developed according to the invention has high clarity in statements and allows alteration, addition or other modification to be effected in a facilitated manner.

(3) Since the intermediate results obtained in the course of designing are held in terms of a collection (tree), these results can be utilized again in the form of a table.

(4) Since the designing process can be represented by tree-like transition from one to another table, a so-called trial and error procedure may be adopted.

We claim:

1. A method developing software of a table translation type, said software being in the form of a string of commands for translating input tables into a desired output table, said software being developed by a processor, said method for developing software comprising the steps of:

registering, if not yet registered, items and definition information representing definitions of said items in a first managing means;

registering, if not yet registered, inter-item dependence relation information representing inter-item dependence relations of said registered items in a second managing means based on said definition information of said items registered in said first managing means;

registering, if not yet registered, inter-item derivation relation information representing inter-item derivation relations of said registered items in a third managing means, wherein each inter-item derivation relation information represents a relationship between first and second registered items;

fetching inter-item dependence relation information from said second managing means and fetching inter-item derivation relation information from said third managing means corresponding to desired items of a desired output table in response to an input from a designer;

deriving various combinations of one or more input tables each including one or more of said items, related to said desired items of said desired output table, based on said fetched inter-item dependence relation information and said fetched inter-item derivation relation information, displaying said various combinations of said one or more input tables on a display means connected to said processor and selecting a combination from said various combinations in response to an input from said designer;

registering in a fourth managing means said desired items of said desired output table and said items, related to said desired items of said desired output table, of each of said input tables of the selected combination;

registering a name of said desired output table and names of said input tables of the selected combination in a fifth managing means; and generating software for translating said input tables of the selected combination into said desired output table based on information registered in said third, fourth and fifth managing means, said software including a string of table translation commands;

said generating step includes the steps of:

fetching said name of said desired output table and said names of said input tables of the selected combination from said fifth managing means, selecting table translation commands from predetermined table translation commands based on a determination of whether said fetched name of said desired output table and said fetched means of said input tables are the same, fetching said desired items of said desired output table and said items, related to said desired items of said desired output table, of said input tables of the selected combination from said fourth managing means, and setting information in said selected table translation commands of said name of said desired output table, said names of said input tables of the selected combination, said desired items of said desired output table and said items, related to said desired items of said desired output table, of said input tables of the selected combination.

2. A system for designing software of a table translation type, said software being in the form of a string of commands for translating input tables into a desired output table, said system comprising:

a keyboard for interfacing with a designer;

first managing means for registering items and definition information representing definitions of said items, said items being inputted through said keyboard;

second managing means for registering dependent relation information representing dependent relations between said items registered in said first managing means, said dependent relation information being inputted through said keyboard;

third managing means for registering derivative relation information representing derivative relations among said items registered in said first managing means, said derivative relation informatin being inputted through said keyboard;

a display for displaying data;

image interface means, operative in response to an input from said designer, for fetching from said second managing means dependent relation information of desired items of a desired output table, fetching from said third managing means derivative relation information of said desired items of said desired output table, fetching from said first managing means items, related to said desired items of said desired output table, based on said fetched dependent and derivative relation information, displaying on said display at least one combination of at least one input table comprising at least one of said fetched items, related to said desired items of said desired output table, and selecting in response to input from said designer a combination from said at least one combination;

fourth managing means for registering said items, related to said desired items of said desired output table, of each input table of said selected combination and registering said desired items of said desired output table;

fifth managing means for registering a name of said desired output table and names of said input tables of the selected combination; and means for generating software in the form of a string of table translation commands for translating said input tables of the selected combination into said desired output table based on information registered in said third, fourth and fifth managing means;

said means for generating fetches said name of said desired output table and said names of said input tables of the selected combination from said fifth managing means, selects table translation commands from predetermined table translation commands based on a determination of whether said fetched name of said desired output table and said fetched names of said input tables are the same, fetches said desired items of said desired output table and said items, related to said desired items of said desired output table, of said input tables of the selected combination from said fourth managing means, and sets information in said selected table translation commands of said name of said desired output table, said names of said input tables of the selected combination, said desired items of said desired output table and said items, related to said desired items of said desired output table, of said input tables of the selected combination.

3. A method for developing software, on a processor, of a table translation type in which said software translates input tables into a desired output table, said method comprising the steps of:

registering, if not yet registered, items and definition information representing definitions of said items in a first managing means;

registering, if not yet registered, inter-item dependence relations information representing inter-item dependence relations of said registered items in a second managing means;

registering, if not yet registered, inter-item derivation relation information representing inter-item derivation relations of said registered items in a third managing means, wherein each inter-item derivation relation information defines a relationship between first and second registered items;

fetching inter-item dependence relations information from said second managing means and fetching inter-item derivation relation information from said third managing means corresponding to desired items of a desired output table in response to input by a designer;

deriving various combinations of one or more input tables each including one or more of said items, related to said desired items of said desired output table, based on said fetched inter-item dependence relation information and said fetched inter-item derivation relation information, displaying said various combinations of one or more input tables on a display means connected to said processor, and selecting in response to input from said designer a combination from said various combinations;

registering in a fourth managing means said desired items of said desired output table and said items, related to said desired items of said desired output table, of each of said input tables of the selected combination;

registering a name of said desired output table and names of said input tables of the selected combination in a fifth managing means; and developing software based on said registered names of said input tables and said desired output table, items of each table and inter-item derivation relation information for items constituting said input and desired output tables;

said developing step includes the steps of:

fetching said name of said desired output table and said names of said input tables of the selected combination from said fifth managing means, selecting table translation commands from predetermined table translation commands based on a determination of whether said fetched name of said desired output table and said fetched names of said input tables are the same, fetching said desired items of said desired output table and said items, related to said desired items of said desired output table, of said input tables of the selected combination from said fourth managing means, and setting information in said selected table translation commands of said name of said desired output table, said names of said input tables of the selected combination, said desired items of said desired output table and said items, related to said desired items of said desired output table, of said input tables of the selected combination.

4. A system for designing software of a table translation type in which said software translates input tables into a desired output table, said system comprising:

a keyboard for interfacing with a designer;

first managing means for registering items and definition information representing definitions of said items, said items being inputted through said keyboard;

second managing means for registering dependent relation information representing dependent relations between said items registered in said first managing means, said dependent relations being inputted through said keyboard;

third managing means for registering derivation relation information representing derivation relations among said item registered in said first managing means, said derivation relation information being inputted through said keyboard;

a display for displaying data;

image interface means, operative in response to input from said designer, for fetching from said second managing means dependent relation information of desired items of a desired output table, fetching from said third managing means derivation relation information of said desired items of said desired output table, fetching from said first managing means items, related to said desired items of said desired output table, based on said fetched dependent and derivation relation information, displaying on said display at least one combination of at least one input table comprising at least one of said fetched items, related to said desired items of said desired output table, and selecting in response to input from said designer a combination of at least one input table from said displayed at least one combination;

fourth managing means for registering items, related to said desired items of said desired output table, of each input table of said selected combination of at least one input table and registering said desired items of said desired output table;

fifth managing means for registering a name of the desired output table and names of the at least one input table of the selected combination; and software developing means for developing software based on registered names of said at least one input table of the selected combination and said desired output table, items of each table, and inter-item derivation relation information of items constituting said input and desired output tables;

said software developing means fetches said name of said desired output table and said names of said at least one input table of the selected combination from said fifth managing means, selects table translation commands from predetermined table translation commands based on a determination of whether said fetched name of said desired output table and said fetched names of said input tables are the same, fetches said desired items of said desired output table and said items, related to said desired items of said desired output table, of said at least one input table of the selected combination from said fourth managing means, and sets information in said selected table translation commands of said name of said desired output table, said names of said at least one input table of the selected combination, said desired items of said desired output table and said items, related to said desired items of said desired output table, of said at least one input table of the selected combination.

* * * * *